(12) United States Patent
Feng et al.

(10) Patent No.: US 10,040,267 B2
(45) Date of Patent: Aug. 7, 2018

(54) COMPOSITE MATERIAL HAVING THREE-DIMENSIONAL TEXTURE AND METHOD FOR MAKING THE SAME

(71) Applicant: San Fang Chemical Industry Co., Ltd., Kaohsiung (TW)

(72) Inventors: Chung-Chih Feng, Kaohsiung (TW); Pai-Hsiang Wu, Kaohsiung (TW); Chien-Chia Huang, Kaohsiung (TW); Tsung-Yu Tsai, Kaohsiung (TW)

(73) Assignee: SAN FANG CHEMICAL INDUSTRY CO., LTD., Kaohsiung (TW)

( * ) Notice: Subject to any disclaimer, the term of this patent is extended or adjusted under 35 U.S.C. 154(b) by 229 days.

(21) Appl. No.: 14/952,759

(22) Filed: Nov. 25, 2015

(65) Prior Publication Data
US 2017/0001409 A1    Jan. 5, 2017

(30) Foreign Application Priority Data
Jul. 1, 2015    (TW) .............................. 104121384 A

(51) Int. Cl.
*B32B 3/28* (2006.01)
*B32B 5/02* (2006.01)
(Continued)

(52) U.S. Cl.
CPC .............. *B32B 3/28* (2013.01); *B29C 41/32* (2013.01); *B29C 59/046* (2013.01); *B29C 59/06* (2013.01);
(Continued)

(58) Field of Classification Search
CPC ....................................................... B29C 41/32
(Continued)

(56) References Cited

U.S. PATENT DOCUMENTS 5,059,277 A * 10/1991 Willhite, Jr. ...... A61F 13/15699
                                                          156/580.1
6,187,696 B1    2/2001 Lim et al.
(Continued)

FOREIGN PATENT DOCUMENTS

CN          2855737 Y      1/2007
CN         202271606    *  6/2012 ............. B32B 27/08
(Continued)

OTHER PUBLICATIONS

English Abstract of TW200610854.
(Continued)

*Primary Examiner* — Matthew J Daniels
*Assistant Examiner* — Kimberly A Stewart
(74) *Attorney, Agent, or Firm* — WPAT, P.C., Intellectual Property Attorneys; Anthony King

(57) ABSTRACT

The present invention relates to a composite material having a three-dimensional texture and a method for making the same. The composite material includes a base material and a surface layer. The surface layer is disposed on a surface of the base material, and has a substantially uniform thickness. The surface layer includes at least one first portion and at least one second portion. The first portion is attached to the surface of the base material. The second portion is spaced apart from the surface of the base material to form at least one hole.

3 Claims, 5 Drawing Sheets

(51) Int. Cl.
    *B32B 7/04*     (2006.01)
    *B32B 27/40*     (2006.01)
    *B29C 41/32*     (2006.01)
    *B29C 59/06*     (2006.01)
    *B29C 65/00*     (2006.01)
    *B29C 59/04*     (2006.01)
    *B32B 33/00*     (2006.01)
    *B32B 38/10*     (2006.01)
    *B32B 37/14*     (2006.01)
    *B29K 105/00*     (2006.01)
    *B29K 75/00*     (2006.01)
    *B29L 9/00*     (2006.01)
    *B29K 675/00*     (2006.01)
    *B32B 37/00*     (2006.01)
    *B32B 38/06*     (2006.01)
    *B32B 38/18*     (2006.01)

(52) U.S. Cl.
    CPC ............ *B29C 65/002* (2013.01); *B32B 5/022* (2013.01); *B32B 5/024* (2013.01); *B32B 5/028* (2013.01); *B32B 7/045* (2013.01); *B32B 27/40* (2013.01); *B32B 33/00* (2013.01); *B29K 2075/00* (2013.01); *B29K 2105/0058* (2013.01); *B29K 2105/0097* (2013.01); *B29K 2105/256* (2013.01); *B29K 2675/00* (2013.01); *B29K 2713/00* (2013.01); *B29L 2009/005* (2013.01); *B32B 37/0053* (2013.01); *B32B 37/14* (2013.01); *B32B 38/06* (2013.01); *B32B 38/10* (2013.01); *B32B 38/1858* (2013.01); *B32B 2307/724* (2013.01)

(58) Field of Classification Search
    USPC ....................................................... 264/505
    See application file for complete search history.

(56) References Cited

U.S. PATENT DOCUMENTS

2004/0195730 A1* 10/2004 van Weperen ............ B26F 1/26
    264/400

2008/0138638 A1* 6/2008 Withers ................ B29C 59/022
    428/480
2014/0353883 A1* 12/2014 Wang ..................... B29C 65/18
    264/511

FOREIGN PATENT DOCUMENTS

| | | |
|---|---|---|
| CN | 104228082 A | 12/2014 |
| JP | H08258176 A | 10/1996 |
| TW | 394729 | 6/2000 |
| TW | 200610854 | 4/2006 |
| TW | 200948606 | 12/2009 |
| TW | M454317 | 6/2013 |
| TW | M465283 | 11/2013 |
| TW | 201444672 | 12/2014 |

OTHER PUBLICATIONS

English Abstract of TW394729.
Search report dated Sep. 6, 2016 by the Taiwan Intellectual Property Office for the counterpart Taiwan Patent Application No. 104121384.
English translation of the search report dated Sep. 6, 2016 by the Taiwan Intellectual Property Office for the aounterpart Taiwan Patent Application No. 104121384.
English abstract translation of CN 202271606.
English abstract translation of TW 200948606.
English abstract translation of TW M465283.
English abstract translation of TW 201444672.
English abstract translation of TW M454317.
Office action and search report dated Dec. 4, 2017 by the China Intellectual Property Office for the counterpart China Patent Application No. 201510399054.4.
English translation of the search report dated Dec. 4, 2017 by the China Intellectual Property Office for the counterpart China Patent Application No. 201510399054.4.
English abstract translation of CN2855737Y.
English abstract translation of CN104228082A.
English abstract translation of JPH08258176A.

* cited by examiner

COMPOSITE MATERIAL HAVING THREE-DIMENSIONAL TEXTURE AND METHOD FOR MAKING THE SAME

BACKGROUND OF THE INVENTION

1. Field of the Invention

The present invention relates to a composite material and a method for making the same, and more particularly to a composite material having a three-dimensional texture and a method for making the same.

2. Description of the Related Art

Conventionally, there are two manners of forming a texture on a composite material. The first one is using technology such as laser engraving or abrasive machining to remove a portion of a resin layer on a base cloth, thereby producing a three-dimensional texture. Such a manner has disadvantages as follows: the surface of the texture is uneven, a burnt edge phenomenon easily occurs, and the texture is inadequately smooth. In addition, a pungent smell of burning resin may be generated during the manufacturing process, which will affect the environment.

The second one is using technology such as embossing or release paper transfer to pressurize a surface of the resin layer on the base cloth, thereby producing a three-dimensional texture. Such a manner has disadvantages as follows: undesirably uniform texture depth, poor hand feel or unappealing tactile sensation (relative to the unpressed portion, the pressed portion is solid, the density thereof is enhanced, the hand feel thereof is hard, and the thickness thereof is diminished), and texture options are limited according to the patterns available on pressing tools. In addition, such a manufacturing manner takes a relatively long time from development to mass production, and thus cannot be introduced and modified rapidly to meet market demands.

Therefore, it is necessary to provide an innovative and progressive composite material and a method for making the same, so as to solve the foregoing problems.

SUMMARY OF THE INVENTION

The present invention provides a composite material having a three-dimensional texture. The composite material comprises a base material and a surface layer. The base material has a first surface. The surface layer is disposed on the first surface of the base material and has a substantially uniform thickness. The surface layer includes at least one first portion and at least one second portion. The first portion is attached to the first surface of the base material, and the second portion is spaced apart from the first surface of the base material to form at least one hole.

The present invention further provides a composite material having a three-dimensional texture. The composite material comprises a base material and a surface layer. The base material has a first surface, at least one first portion and at least one second portion, wherein the base material has a substantially uniform thickness. The surface layer is completely attached to the first surface of the base material and has a substantially uniform thickness. The surface layer includes at least one first portion and at least one second portion. The first portion and the second portion of the surface layer respectively correspond to the first portion and the second portion of the base material. The second portion of the surface layer and the second portion of the base material protrude from the first portion of the surface layer and the first portion of the base material to form a cavity.

The present invention further provides a method for making a composite material having a three-dimensional texture, comprising the following steps: (a) providing a composite material, wherein the composite material includes a base material and a surface layer; (b) heating and softening the surface layer; (c) providing a mold, wherein the mold has a texture on a first surface thereof; (d) placing the surface layer adjacent to the first surface of the mold; and (e) applying a suction force from a second surface of the mold, so that the surface layer is attached to the first surface of the mold to form a three-dimensional texture, wherein the three-dimensional texture of the surface layer corresponds to the texture of the mold.

BRIEF DESCRIPTION OF THE DRAWINGS

The invention will be described according to the appended drawings, in which.

PREFERRED EMBODIMENT OF THE PRESENT INVENTION

FIGS. 1 to 6 show schematic views of a method for making a composite material having a three-dimensional texture according to an embodiment of the present invention. Referring to FIGS. 1 to 4, a composite material 10 (FIG. 4) is provided. The composite material 10 includes a base material 18 and a surface layer 19. The method in this embodiment for making the composite material 10 is described as follows.

Figure 1:
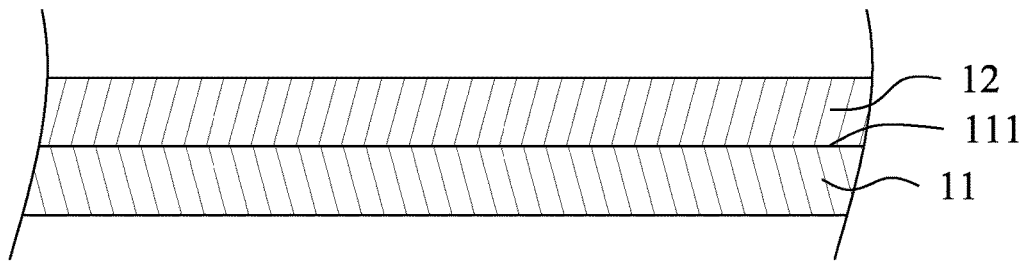
FIGS. 1 to 6 are schematic views of a method for making a composite material having a three-dimensional texture according to an embodiment of the present invention.

Referring to FIG. 1, a release paper 11 is provided. The release paper 11 has a first surface 111. The release paper 11 may or may not have any surface texture or surface pattern. Then, a second polymer mixture is formed on the first surface 111 of the release paper 11 by coating, wherein the second polymer mixture includes a second polymer resin. The solid content of the second polymer resin is about 10% to 30% by weight, and the viscosity of the second polymer resin is about 500 cps to 2000 cps. Preferably, the solid content of the second polymer resin is about 15% by weight, and the viscosity of the second polymer resin is about 800 cps to 1000 cps. The material of the second polymer resin is selected from a group consisting of polyurethane resin, polycarbonate resin, polyester resin, polypropylene resin, polyethylene terephthalate resin, polyvinylchloride resin, acrylic resin and epoxy resin. In this embodiment, the material of the second polymer resin is polyurethane resin, and the coating amount thereof is 187.5 g/m$^2$. Then, the second polymer mixture is dried and solidified at 50° C. to 130° C. gradually in four minutes to form a coating layer 12. It is noted that, if desired, the second polymer mixture may be coated more than one time, so as to increase the thickness of the coating layer 12. In this embodiment, the thickness of the coating layer 12 is greater than 0.02 mm, preferably 0.2 mm to 2.0 mm, and more preferably 1 mm. If the release paper 11 has a surface texture or surface pattern, the coating layer 12 has a corresponding surface texture.

Figure 2:
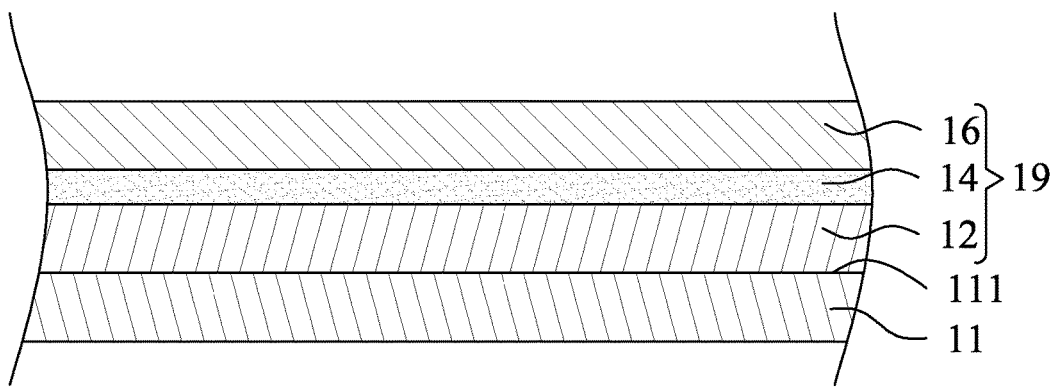

Referring to FIG. 2, an adhesive layer 14 is formed on the coating layer 12 by coating, wherein the adhesive layer 14 is polyurethane (PU) adhesive paste or hot glue. The solid content of the adhesive layer 14 is about 20% to 80% by weight, and the viscosity of the adhesive layer 14 is about 6000 cps to 20000 cps. Preferably, the solid content of the adhesive layer 14 is about 25% to 35% by weight, and the viscosity of the adhesive layer 14 is about 8000 cps to 12000 cps. In this embodiment, the material of the adhesive layer 14 is polyurethane (PU) adhesive paste, and the coating amount thereof is 187.5 g/m$^2$.

Then, a thermoplastic material layer 16 is formed on the adhesive layer 14. The thermoplastic material layer 16 may be formed by the following two methods. In the first method, the thermoplastic material layer 16 is a semiproduct film (which is the material of a solidified first polymer mixture), and is adhered to the adhesive layer 14. In the second method, a first polymer mixture is formed on the adhesive layer 14 by coating, and then the first polymer mixture is solidified to become the thermoplastic material layer 16. In this embodiment, the above-mentioned second method is adopted, wherein the first polymer mixture includes a first polymer resin. The solid content of the first polymer resin is about 20% to 100% by weight, and the viscosity of the first polymer resin is about 2000 cps to 12000 cps. That is, the solid content of the first polymer resin is greater than the solid content of the second polymer resin, and the viscosity of the first polymer resin is greater than the viscosity of the second polymer resin. Preferably, the solid content of the first polymer resin is about 25% to 30% by weight, and the viscosity of the first polymer resin is about 4000 cps to 8000 cps. The material of the first polymer resin is selected from a group consisting of thermoplastic urethane (TPU), thermoplastic elastomer (TPE), polyvinylchloride resin, polypropylene resin, polystyrene resin, polyamide resin, nylon, polyester resin, polyurethane resin and acrylonitrile butadiene styrene. In this embodiment, the material of the first polymer resin is thermoplastic urethane (TPU), and the thickness of the thermoplastic material layer 16 is 0.05 mm to 10 mm.

Meanwhile, the coating layer 12, the adhesive layer 14 and the thermoplastic material layer 16 form the surface layer 19. However, in other embodiments, the adhesive layer 14 may be omitted, and the thermoplastic material layer 16 is formed on the coating layer 12 directly. That is, the surface layer 19 only includes the thermoplastic material layer 16 and the coating layer 12. Alternatively, the adhesive layer 14 and the thermoplastic material layer 16 may be omitted. That is, the surface layer 19 may include only the coating layer 12. Alternatively, the surface layer 19 may be a structure including more than three layers.

Figure 3:
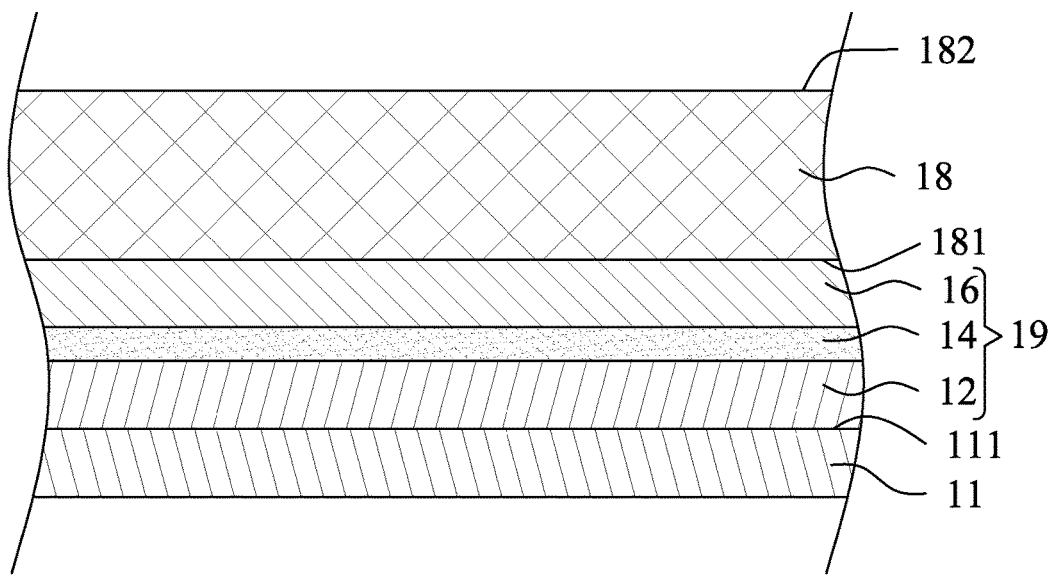

Referring to FIG. 3, a base material 18 is attached to the surface layer 19. The base material 18 is woven fabric, net fabric, non-woven fabric, ultra-fine fibre artificial leather, leather, plastic or thermoplastic urethane (TPU). Preferably, the base material 18 is an air-permeable material. In this embodiment, the base material 18 is adhered to the thermoplastic material layer 16 of the surface layer 19; however, it can be understood that if the thermoplastic material layer 16 is omitted, the base material 18 is directly adhered to the coating layer 12. The base material 18 includes a first surface 181 and a second surface 182, the second surface 182 is opposite the first surface 181, and the first surface 181 is in contact with the thermoplastic material layer 16. In this embodiment, the base material 18 is ultra-fine fibre artificial leather model number KJ30 produced by SAN FANG CHEMICAL INDUSTRY CO., LTD.

Figure 4:
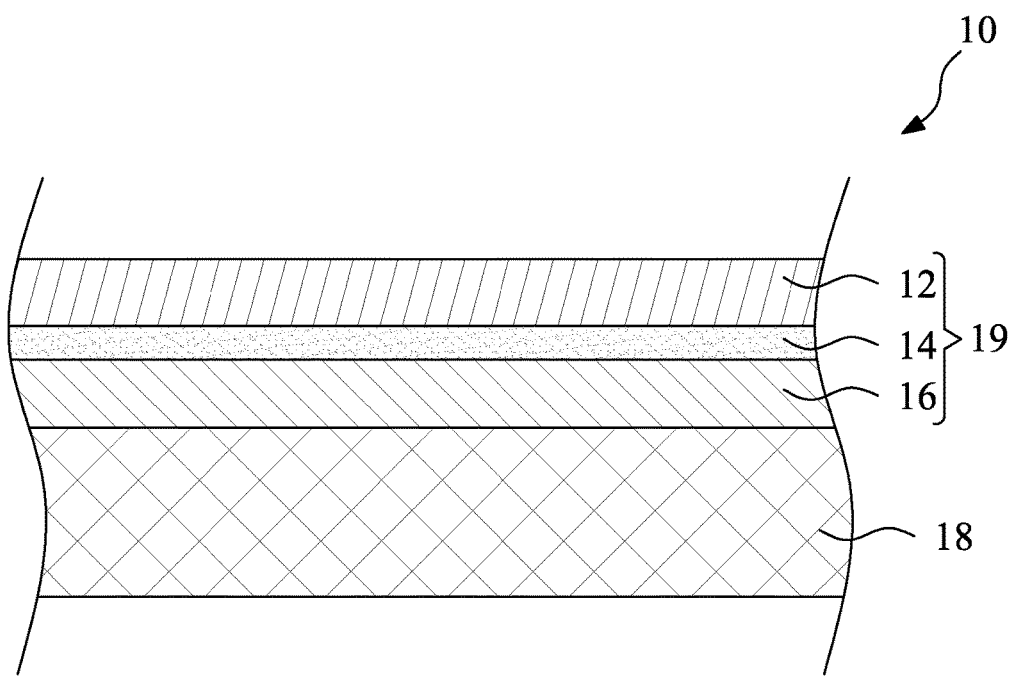

Referring to FIG. 4, the release paper 11 is removed. That is, after the structure obtained from the process described in FIG. 3 is released from the release paper 11, the structure is laid aside and aged for a period of time (up to 2 days) to form a composite material 10.

Figure 5:
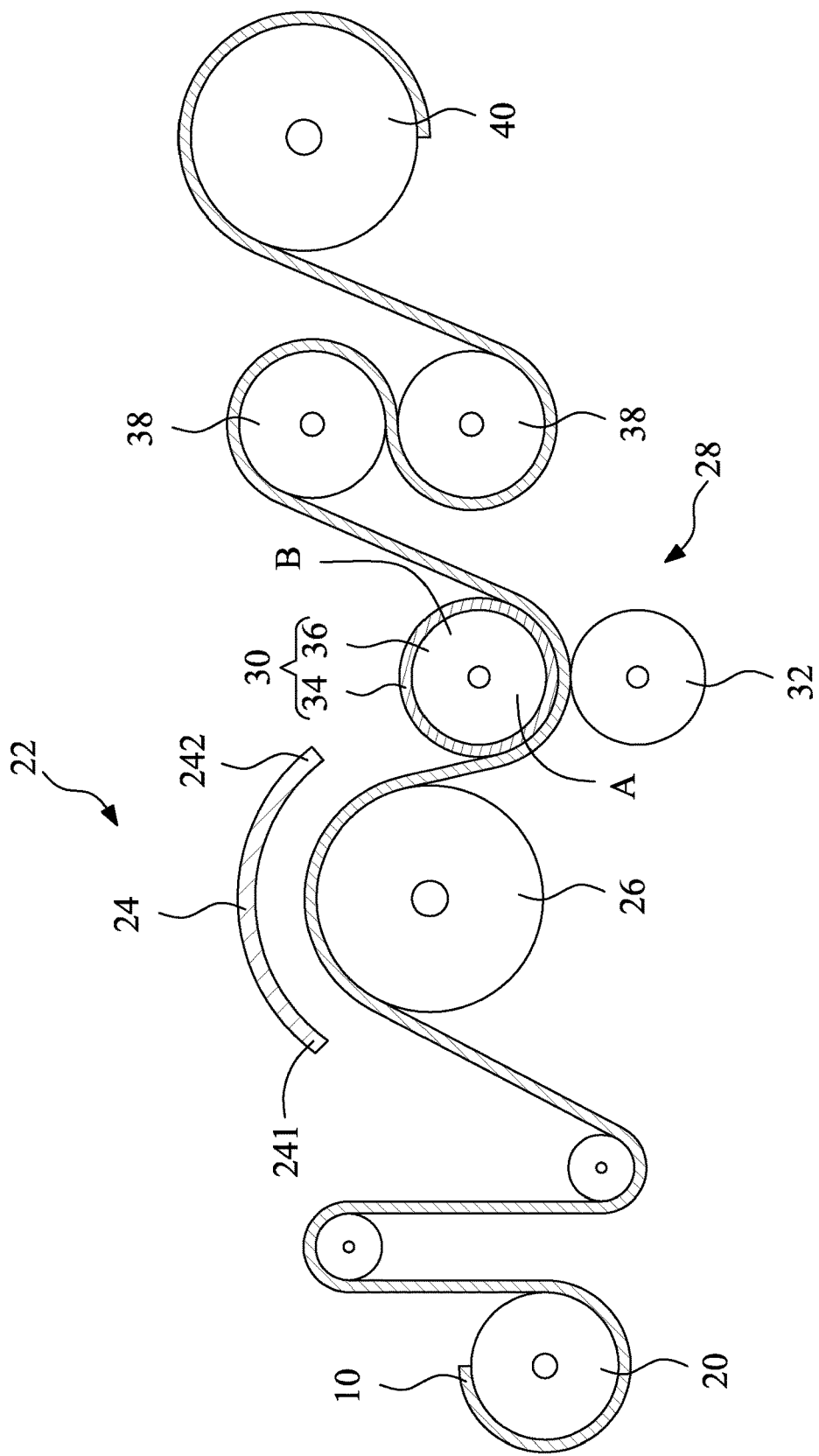

Referring to FIG. 5, the surface layer 10 is heated and softened. In this embodiment, the composite material 10 is continuously conveyed to a heating zone 22 from a sending wheel 20, to heat and soften the coating layer 12 of the surface layer 10. The heating zone 22 includes a heating mantle 24 and a heating wheel 26. The heating mantle 24 includes an inlet end 241 and an outlet end 242, and the temperature of the heating mantle 24 is gradually increased from the inlet end 241 to the outlet end 242. For example, the temperature is gradually increased from 60° C. at the inlet end 241 to 180° C. at the outlet end 242. The heating wheel 26 drives the composite material 10 from the inlet end 241 to the outlet end 242. Meanwhile, the coating layer 12 of the surface layer 10 faces outward and faces the heating mantle 24 so as to be gradually heated and softened. Then, the heating wheel 26 continuously conveys the composite material 10 to a texture-forming zone 28.

Figure 6:
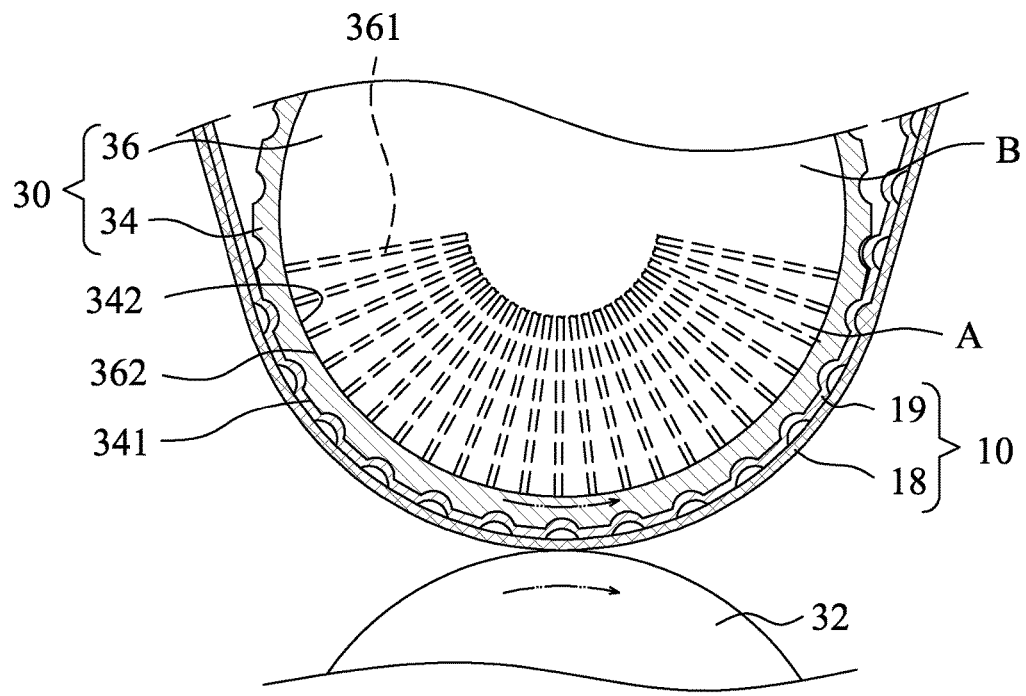

Referring to FIG. 5 and FIG. 6, wherein FIG. 6 is a partially enlarged schematic diagram of the texture-forming zone 28, a mold 34 is provided, wherein the mold 34 has a texture on a first surface 341. In this embodiment, the texture-forming zone 28 provides a texture wheel 30 and a support wheel 32, and the composite material 10 is sucked by the texture wheel 30 and is sandwiched/clamped between the support wheel 32 and the texture wheel 30. In this embodiment, the support wheel 32 is a driven wheel made of rubber. The texture wheel 30 includes a center wheel 36 and the mold 34. The center wheel 36 is stationary and has a plurality of exhaust passages 361, wherein one end of each of the exhaust passages 361 has an opening on a peripheral surface 362 of the center wheel 36, and the other end thereof is connected to a suction device (for example, a vacuum source) (not shown). It should be noted that the exhaust passages 361 are only disposed at the position corresponding to the position where the texture wheel 30 is in contact with the composite material 10, while there is no exhaust passage 361 at the position where the texture wheel 30 is not in contact with the composite material 10. For example, the center wheel 36 may be divided into a region A and a region B, wherein the region A corresponds to the position where the texture wheel 30 is in contact with the composite material 10 (about the lower half of the center wheel 36), and the region B corresponds to the position where the texture wheel 30 is not in contact with the composite material 10 (about the upper half of the center wheel 36). The exhaust passages 361 are merely located in the region A, but not in the region B.

The mold 34 is annular, is in close contact with and surrounds the center wheel 36, and can rotate relative to the center wheel 36. The mold 34 includes a first surface 341, a second surface 342 and a texture. The first surface 341 is opposite the second surface 342, and the texture is disposed on the first surface 341. The second surface 342 is in contact with the peripheral surface 362 of the center wheel 36. The mold 34 is an air-permeable structure, and is made of ceramic or metal (for example, copper, aluminum, iron, steel and alloys thereof). In this embodiment, the mold 34 per se is air-permeable, for example, a ceramic material; however, in other embodiments, the mold 34 is a metal material, and is air-permeable after machining; for example, a plurality of air holes (not shown) may be formed to extend from the first surface 341 to the second surface 342 to penetrate through the mold 34.

The surface layer 19 of the composite material 10 is placed adjacent the first surface 341 of the mold 34. In this embodiment, the composite material 10 from the heating zone 22 is continuously brought to the texture wheel 30, wherein the surface layer 19 of the composite material 10 is adjacent to the first surface 341 of the mold 34.

Figure 7:
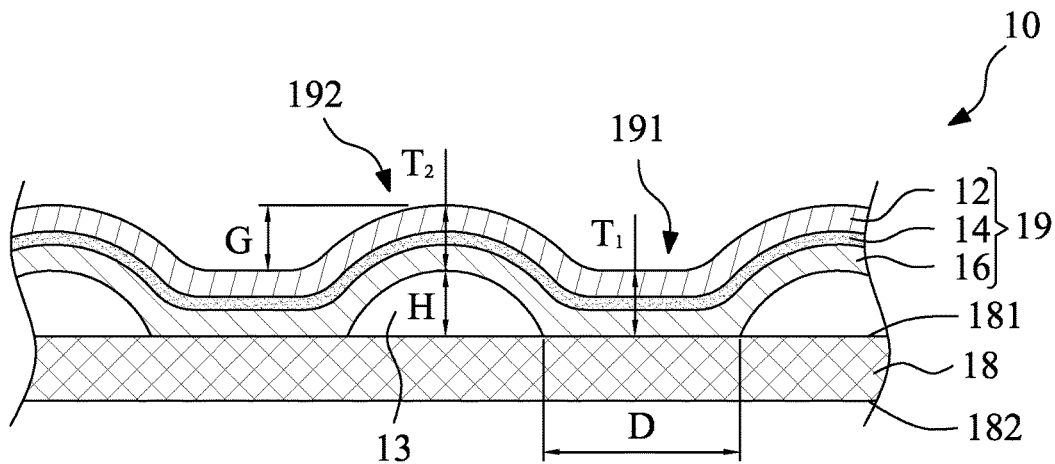
FIG. 7 is a schematic cross-sectional view of a composite material having a three-dimensional texture according to an embodiment of the present invention.

Next, a suction force is applied from the second surface 342 of the mold 34 so that the surface layer 19 is attached to the first surface 341 of the mold 34 to form a three-dimensional texture, wherein the three-dimensional texture of the surface layer 19 corresponds to the texture of the mold 34. At this point, the composite material 10 having a three-dimensional texture is formed, as shown in FIG. 7. In this embodiment, the suction device continuously intakes air to produce a negative pressure, and preferably, the negative pressure is a negative atmospheric pressure (−1 atm). When the composite material 10 is moved together with the mold 34 to the region A, air between the surface layer 19 and the first surface 341 of the mold 34 is sucked into the suction device via the mold 34 and the exhaust passages 361, so that the surface layer 19 is closely attached to the first surface 341 of the mold 34 to form a three-dimensional texture. Thus, the three-dimensional texture of the composite material 10 is formed by using the mold 34 accompanied with a suction force, instead of being formed by conventional techniques such as removal machining or surface pressurization. Therefore, the surface layer 19 has a substantially uniform thickness, density and hardness; that is, the thickness, density and hardness of each position of the surface layer 19 are not affected, which results in a better hand feel. In addition, the texture of the mold 34 can be changed as required so as to change the three-dimensional texture of the composite material 10, and the depth of the three-dimensional texture of the composite material 10 and the thicknesses of each layer of the composite material 10 can be controlled. Moreover, the present invention can be produced more quickly and introduced into the market more efficiently. Further, the manufacturing method of the present invention is not likely to produce environmental pollution.

In this embodiment, a first portion of the surface layer 19 is attached to the base material 18, and a second portion of the surface layer 19 is spaced apart from the base material 18 to form at least one hole 13. That is, during the absorption process of the surface layer 19, the base material 18 still keeps its shape rather than being bent or recessed according to the surface layer 19. Therefore, an adhesive force between the second portion of the surface layer 19 (corresponding to the recessed part of the texture of the mold 34) and the base material 18 is less than the suction force of the suction device applied to the surface layer 19, so that the second portion of the surface layer 19 is separated or stripped from the base material 18, so as to form the composite material 10 as shown in FIG. 7.

Figure 8:
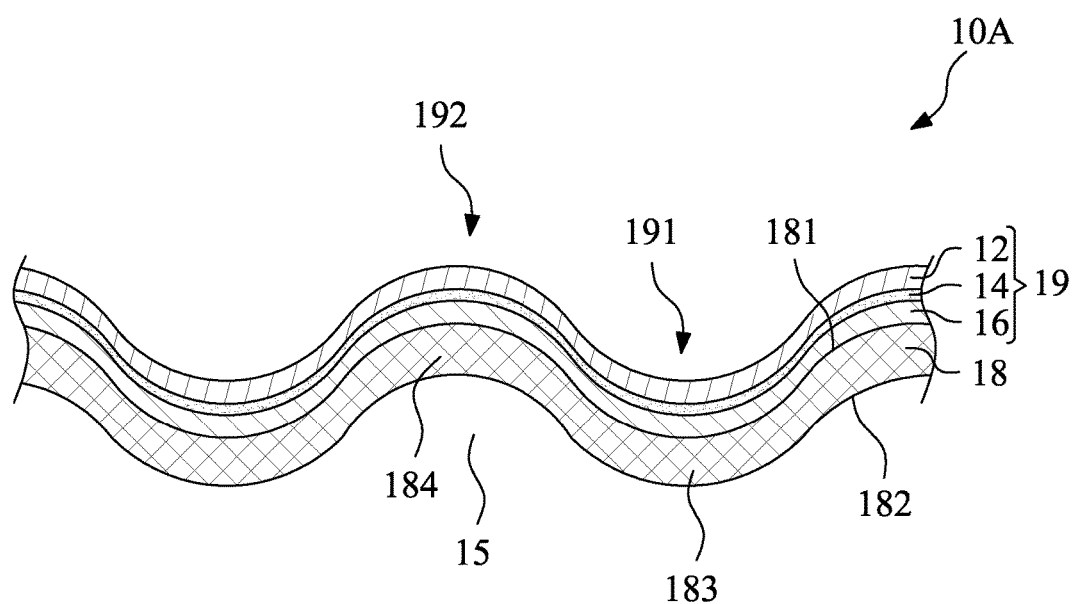
FIG. 8 is a schematic cross-sectional view of a composite material having a three-dimensional texture according to another embodiment of the present invention.

However, in other embodiments, the surface layer 19 is completely attached to the base material 18, and by selecting appropriate materials and machining parameters, the adhesive force between the surface layer 19 and the base material 18 is greater than the suction force of the suction device applied to the surface layer 19, so that the second portion of the surface layer 19 will not to be separated or stripped from the base material 18. During the absorption process of the surface layer 19, the base material 18 cannot keep its shape and will be bent or recessed according to the surface layer 19, to form the composite material 10A as shown in FIG. 8.

Then, referring to FIG. 5, when the composite material 10 moves together with the mold 34 to the region B, the region of the texture wheel 30 that corresponds to the region B will not produce any suction force to the composite material 10 because there is no exhaust passage 361 in that region. Thus, the composite material 10 will be disconnected or separated from the texture wheel 30, and then conveyed to at least one cooling wheel 38. The cooling wheel 38 is used to lower the temperature of the composite material 10, so as to solidify the surface layer 19. Then, the composite material 10 is continuously rolled by a rolling wheel 40.

In this embodiment, the heating wheel 26 and the mold 34 of the texture wheel 30 are wheel-like, to accomplish continuous production; however, it can be understood that in other embodiments, the heating wheel 26 and the mold 34 may be a flat structure to be capable of continuous or non-continuous production.

FIG. 7 is a schematic cross-sectional view of a composite material having a three-dimensional texture according to an embodiment of the present invention. The composite material 10 comprises a base material 18 and a surface layer 19. The base material 18 is woven fabric, net fabric, non-woven fabric, ultra-fine fibre artificial leather, leather, plastic or thermoplastic urethane (TPU). Preferably, the base material 18 is an air-permeable material. The base material 18 includes a first surface 181 and a second surface 182, and the second surface 182 is opposite the first surface 181. In this embodiment, the base material 18 is ultra-fine fibre artificial leather, model number of KJ30 produced by SAN FANG CHEMICAL INDUSTRY CO., LTD. The first surface 181 is substantially flat.

The surface layer 19 is disposed on the first surface 181 of the base material 18. In this embodiment, the surface layer 19 includes a thermoplastic material layer 16, an adhesive layer 14 and a coating layer 12. The thermoplastic material layer 16 is directly disposed on the first surface 181 of the base material 18, and the coating layer 12 is adhered to the thermoplastic material layer 16 by the adhesive layer 14. However, in other embodiments, the adhesive layer 14 may be omitted, in which case the coating layer 12 is applied to the thermoplastic material layer 16 directly. That is, the surface layer 19 only includes the thermoplastic material layer 16 and the coating layer 12. Alternatively, the adhesive layer 14 and the thermoplastic material layer 16 may be omitted, so that the coating layer 12 is formed on the first surface 181 of the base material 18 directly. That is, the surface layer 19 only includes the coating layer 12. Alternatively, the surface layer 19 may be a structure including more than three layers.

The thermoplastic material layer 16 is made of a cured first polymer mixture. The first polymer mixture includes a first polymer resin. The solid content of the first polymer resin is about 20% to 100% by weight, and the viscosity of the first polymer resin is about 2000 cps to 12000 cps. That is, the solid content of the first polymer resin is greater than the solid content of the second polymer resin, and the viscosity of the first polymer resin is greater than the viscosity of the second polymer resin. Preferably, the solid content of the first polymer resin is about 25% to 30% by weight, and the viscosity of the first polymer resin is about 4000 cps to 8000 cps. The material of the first polymer resin is selected from a group consisting of thermoplastic urethane (TPU), thermoplastic elastomer (TPE), polyvinylchloride resin, polypropylene resin, polystyrene resin, polyamide resin, nylon, polyester resin, polyurethane resin and acrylonitrile butadiene styrene. In this embodiment, the material of the first polymer resin is thermoplastic urethane (TPU), and the thickness of the thermoplastic material layer 16 is 0.05 mm to 10 mm.

The adhesive layer 14 is made of a cured polyurethane (PU) adhesive paste or hot glue. The solid content of the polyurethane (PU) adhesive paste or hot glue is about 20% to 80% by weight, and the viscosity thereof is about 6000 cps to 20000 cps. Preferably, the solid content of the polyurethane (PU) adhesive paste or hot glue is about 25% to 35% by weight, and the viscosity thereof is about 8000 cps to 12000 cps. In this embodiment, the material of the adhesive layer 14 is polyurethane (PU) adhesive paste.

The coating layer 12 is made of a cured second polymer mixture. The second polymer mixture includes a second polymer resin. The solid content of the second polymer resin is about 10% to 30% by weight, and the viscosity of the second polymer resin is about 500 cps to 2000 cps. Preferably, the solid content of the second polymer resin is about 15% by weight, and the viscosity of the second polymer resin is about 800 cps to 1000 cps. The material of the second polymer resin is selected from a group consisting of polyurethane resin, polycarbonate resin, polyester resin, polypropylene resin, polyethylene terephthalate resin, polyvinylchloride resin, acrylic resin and epoxy resin. In this embodiment, the material of the second polymer resin is polyurethane resin, and the thickness of the coating layer 12 is greater than 0.02 mm, preferably 0.2 mm to 2.0 mm, and more preferably 1 mm.

The surface layer 19 has a substantially uniform thickness, hardness and density. The surface layer 19 includes at least one first portion 191 and at least one second portion 192, and the first portion 191 and the second portion 192 are distributed alternatively. The first portion 191 is attached to the first surface 181 of the base material 18 to form a recess portion, and the second portion 192 is spaced apart from the first surface 181 of the base material 18 to form at least one hole 13 and a protruded portion. That is, the hole 13 is defined by the bottom surface of the second portion 192 and the first surface 181 of the base material 18, and the recess portion and the protruded portion form the three-dimensional texture.

The three-dimensional texture of the composite material 10 is formed by using the mold 34 accompanied with a suction force, instead of being formed by conventional technology such as removal machining or surface pressurization. Therefore, the surface layer 19 has a substantially uniform thickness, density and hardness. That is, the thickness $T_1$ of the first portion 191 of the surface layer 19 is substantially equal to the thickness $T_2$ of the second portion 192 of the surface layer 19, and the density and hardness of the first portion 191 of the surface layer 19 are substantially equal to the density and hardness of the second portion 192 of the surface layer 19, respectively, which results in a better hand feel.

The maximum height H of the hole 13 is substantially equal to the thickness $T_2$ of the second portion 192 of the surface layer 19. The area of the first portion 191 of the surface layer 19 that contacts the first surface 181 of the base material 18 has a maximum width D, wherein the maximum width D is greater than 0.5 mm. The maximum distance between the top of the first portion 191 and the top of second portion 192 is defined as G, wherein 0.5 mm≤G≤50 mm.

FIG. 8 is a schematic cross-sectional view of a composite material having a three-dimensional texture according to another embodiment of the present invention. The composite material 10A having a three-dimensional texture of this embodiment is similar to the composite material 10 having a three-dimensional texture as shown in FIG. 7, and the difference is described as follows. In the composite material 10A having a three-dimensional texture of this embodiment, the surface layer 19 is completely attached to the first surface 181 of the base material 18, and the base material 18 is bent or recessed according to the surface layer 19. The base material 18 has at least one first portion 183 and at least one second portion 184, and has a substantially uniform thickness, hardness and density. The first portion 191 of the surface layer 19 corresponds to the first portion 183 of the base material 18, and the second portion 192 of the surface layer 19 corresponds to the second portion 184 of the base material 18. The second portion 192 of the surface layer 19 and the second portion 184 of the base material 18 protrude from the first portion 191 of the surface layer 19 and the first portion 183 of the base material 18 to form a cavity 15 on the second surface 182 of the base material 18.

The above embodiments only describe the principle and the efficacies of the present invention, and are not used to limit the present invention. Therefore, modifications and variations of the embodiments made by persons skilled in the art do not depart from the spirit of the invention. The scope of the present invention should fall within the scope as defined in the appended claims.

What is claimed is:

1. A method for making a composite material having a three-dimensional texture, comprising the following steps:
   (a) providing a composite material, wherein the composite material includes a base material and a surface layer;
   (b) heating and softening the surface layer;
   (c) providing a mold, wherein the mold has a texture on a first surface thereof;
   (d) placing the surface layer adjacent to the first surface of the mold; and
   (e) applying a suction force from a second surface of the mold, so that the surface layer is attached to the first surface of the mold to form a three-dimensional texture, wherein the three-dimensional texture of the surface layer corresponds to the texture of the mold, wherein the surface layer has a substantially uniform thickness, the surface layer includes at least one first portion and at least one second portion, the first portion is attached to the base material, and the second portion is spaced apart from the base material to form at least one hole.

2. The method according to claim 1, wherein step (a) comprises:
   (a1) providing a release paper;
   (a2) forming the surface layer on the release paper;
   (a3) attaching the base material on the surface layer; and
   (a4) removing the release paper.

3. The method according to claim 1, wherein in step (c), a texture wheel is provided, which includes a center wheel and the mold, wherein the mold surrounds the center wheel, the center wheel is stationary, and the mold is rotatable and is an air-permeable structure.

* * * * *